United States Patent
Bantin

(10) Patent No.: US 9,366,756 B2
(45) Date of Patent: Jun. 14, 2016

(54) RF TAG READER FOR ACCURATE POSITION DETERMINATION

(75) Inventor: Colin Charles Bantin, Oakville (CA)

(73) Assignee: Thales Canada Inc, Toronto, Ontario (CA)

( * ) Notice: Subject to any disclaimer, the term of this patent is extended or adjusted under 35 U.S.C. 154(b) by 2106 days.

(21) Appl. No.: 12/329,564

(22) Filed: Dec. 6, 2008

(65) Prior Publication Data

US 2010/0141454 A1 Jun. 10, 2010

(51) Int. Cl.
*G08B 13/14* (2006.01)
*G01S 13/44* (2006.01)
*G01S 13/76* (2006.01)

(52) U.S. Cl.
CPC ........... *G01S 13/4454* (2013.01); *G01S 13/762* (2013.01)

(58) Field of Classification Search
None
See application file for complete search history.

(56) References Cited

U.S. PATENT DOCUMENTS

| | | | |
|---|---|---|---|
| 4,926,184 A | 5/1990 | Galati et al. | |
| 5,469,172 A * | 11/1995 | Schleder et al. | 342/174 |
| 5,648,767 A * | 7/1997 | O'Connor et al. | 340/928 |
| 6,369,746 B1 * | 4/2002 | Green | G01S 7/36 342/149 |
| 6,868,073 B1 * | 3/2005 | Carrender | 370/278 |
| 7,170,412 B2 * | 1/2007 | Knox et al. | 340/572.1 |
| 2001/0020916 A1 * | 9/2001 | Kurihara | G01S 3/36 342/417 |
| 2006/0044147 A1 | 3/2006 | Knox et al. | |
| 2007/0126583 A1 * | 6/2007 | Maniwa et al. | 340/572.2 |
| 2007/0135167 A1 * | 6/2007 | Liu | 455/562.1 |
| 2007/0257858 A1 * | 11/2007 | Liu | 343/893 |
| 2007/0282196 A1 | 12/2007 | Birk et al. | |
| 2010/0207754 A1 * | 8/2010 | Shostak et al. | 340/450 |

FOREIGN PATENT DOCUMENTS

| EP | 0621492 A1 | 10/1994 |
|---|---|---|
| JP | 2000-338212 A | 12/2000 |

OTHER PUBLICATIONS

Simon Kingsley, "Understanding Radar Systems", McGraw-Hill International (UK) Limited, 1992, ISBN 1-891121-05-7 (retrieved from Google books, http://books.google.com/ on Oct. 21, 2010), p. 50-53).

International Search Report of corresponding application No. PCT/IB2010/000508 mailed Dec. 8, 2010.

Extended European Search Report of corresponding European application No. 10847311.7 mailed Jul. 1, 2014.

* cited by examiner

*Primary Examiner* — George Bugg
*Assistant Examiner* — Renee Dorsey
(74) *Attorney, Agent, or Firm* — Hauptman Ham, LLP

(57) ABSTRACT

A system for accurate positioning using radio frequency tags and corresponding method thereof. The system comprises at least two antennas in phased array combination and an RF tag position determination unit coupled with the at least two antennas. The system also comprises a main RF output and a position detection output. The RF tag position determination unit arranged to generate a position detection signal at the position detection output responsive to comparison of a signal received by each of the at least two antennas.

6 Claims, 4 Drawing Sheets

RF TAG READER FOR ACCURATE POSITION DETERMINATION

BACKGROUND

The position of a radio frequency (RF) tag as read by a tag interrogator may be anywhere within the footprint of the interrogator read antenna. Typically, the footprint width is wider than the desired position accuracy for determining the position of the RF tag with respect to the tag interrogator.

Prior solutions of which the inventor is aware employ a tag interrogator with read footprints of up to 1 meter or more in width. Further, signal processing may be used to estimate the location of the RF tag based on the received signal shape. RF tag position uncertainty, along with other data input, leads to the calculation of a safety distance in front of a vehicle having the tag interrogator in order to maintain a safe separation distance. As the position uncertainty increases so too does the safety separation distance with the result of requiring a larger separation distance than if the position were known. A larger separation distance results in lower vehicle throughput and ultimately less revenue, if applicable, for a vehicle operator.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
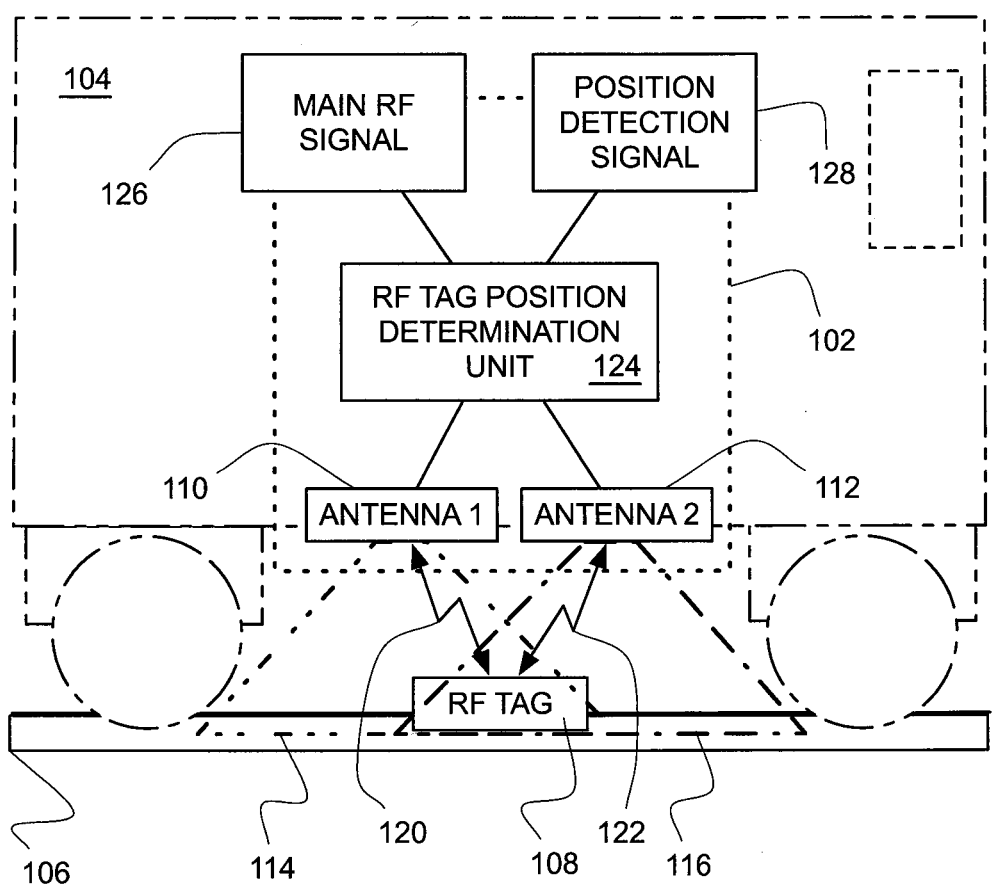
FIG. 1 is a high-level functional block diagram of a system comprising an embodiment of a position determination system.

FIG. 1 depicts a high-level functional block diagram of a system 100 in conjunction with which an embodiment of a position determination system 102 according to an embodiment may be used to great advantage. System 100 is an exemplary system depicting a vehicle 104, e.g. a railroad car, adjacent a travel surface 106, e.g., a rail. For clarity and ease of understanding, FIG. 1 depicts a side view of vehicle 104 above travel surface 106.

As depicted, vehicle 104 comprises position determination system 102 and travels in a direction A along travel surface 106. Vehicle 104 passes by a radio frequency (RF) tag 108, e.g., a radio frequency identification (RFID) tag. In at least some embodiments, alternate RF tag devices may be used replacing RFID tags. In at least some embodiments, tag 108 comprises an RF tag configured to provide a reflection or transponding capability at the RF frequency used. In at least some embodiments, RF tag 108 is affixed to and/or embedded within another item. RF tag 108 may be a passive and/or active device.

Vehicle 104 comprises a pair of antennas ("antenna 1" and "antenna 2") 110, 112, which form a part of position determination system 102, linearly spaced apart from each other along a surface of vehicle 104. In at least some embodiments, antennas 110, 112 are positioned to pass by RF tag 108 in a serial manner at a distance parallel to the RF tag.

Each antenna 110, 112 is combined to form an antenna array which is arranged to generate a signal over a corresponding predetermined footprint, i.e. antenna beam width, referred to as antenna footprint 114 (as indicated by a chained, double-dotted line) and antenna footprint 116 (as indicated by a chained, single-dotted line), respectively within a respective footprints 114, 116. The two footprints result from the antennas combined in a phase coherent way to form sum or difference antenna patterns, i.e., the antennas are used as a phased antenna array. The footprints are the intersection of the array patterns and the ground (plane of the tag), each antenna transmits a signal and receives a reply from RF tag 108 as schematically depicted by signals 120, 122, respectively. The antennas transmit one signal as a sum array, and receive a signal as both a sum and a difference array.

In at least some embodiments, each antenna 110, 112 generates an electromagnetic signal. In at least some embodiments, the antenna footprint may be on the order of 0.5 meter (m) to 1.5 m in width. In at least some embodiments, more than two antennas may be used to form the antenna array. In at least some embodiments, a single phased array antenna may be used in place of individual antennas 110, 112.

In operation, each antenna array 110, 112 is arranged to transmit an interrogation signal to RF tag 108. Responsive to receipt of the interrogation signal from an antenna array, either antenna 110 or antenna 112, RF tag 108 transmits a response signal. In at least some embodiments, the response signal may be a reflection signal or a transponder signal.

Position determination system 102 comprises antennas arrays 110, 112 communicatively coupled with an RF tag position determination unit 124. In at least some embodiments, position determination system 102 is directly electrically coupled with antennas 110, 112. Position determination unit 124 is communicatively coupled with a main RF signal output 126 and a position detection signal output 128. In at least some embodiments, position determination system 102 is directly electrically coupled with main RF signal output 126 and position detection signal output 128.

In a least some embodiments, one or more elements of position determination system 102 may be positioned interior and/or exterior to vehicle 104. In at least some embodiments, each element of position determination system 102 is positioned exterior to vehicle 104; while in other embodiments, each element of the position determination system is positioned interior to the vehicle.

The spacing and orientation of the antennas vary depending on the array patterns that are to be achieved. In at least some embodiments, the antenna array is implemented within one physical antenna package with separate elements representing each antenna. The polarization of the antenna arrays and tag 108 (i.e. the direction of the electric field vector) may be ether across the tracks, i.e., travel surface 106, or parallel to the tracks, depending on the application. In at least some embodiments, transmission of the interrogation signal may be performed by either antenna, or by both antennas configured as a sum array.

Figure 2:
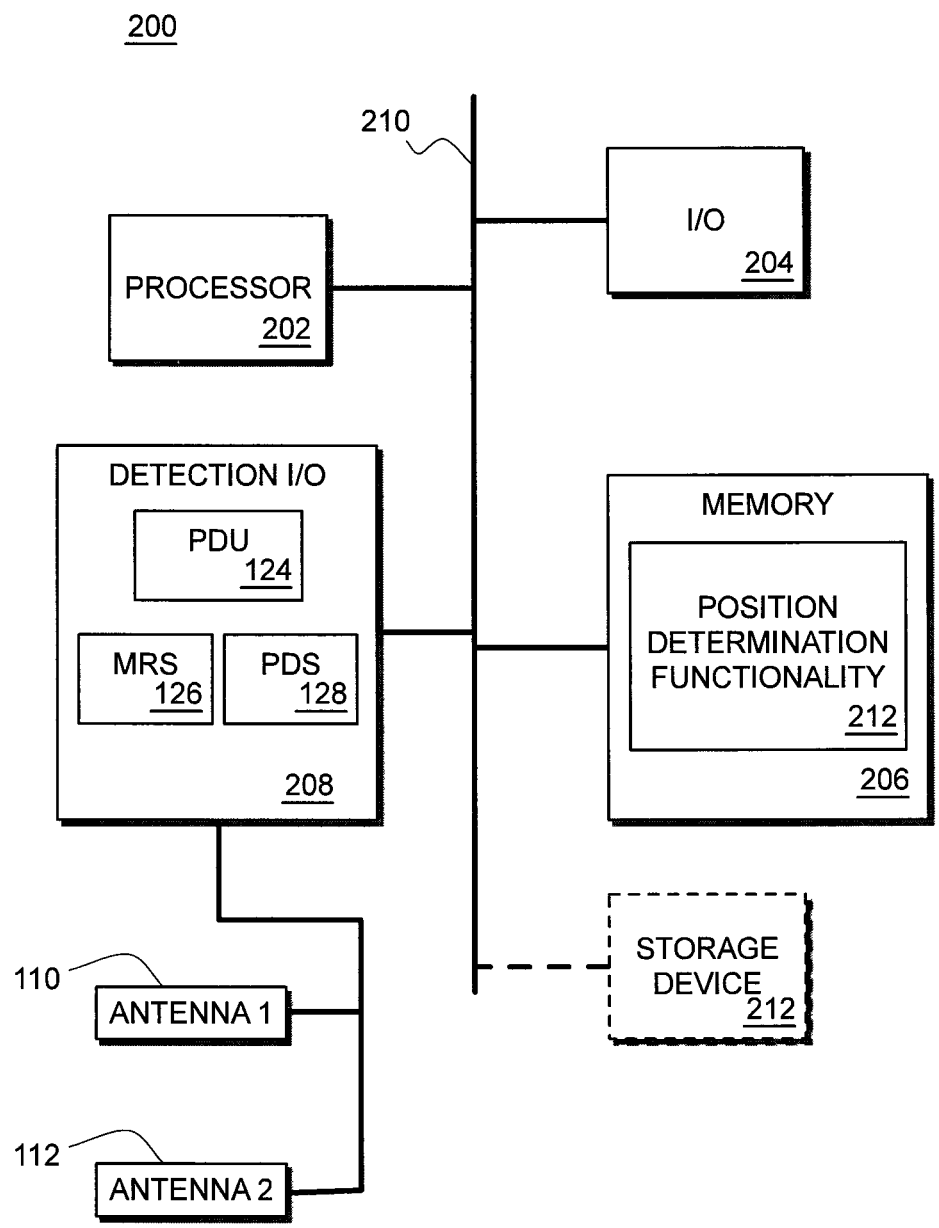
FIG. 2 is a high-level functional block diagram of a computer system usable in conjunction with an embodiment.

FIG. 2 depicts a high-level functional block diagram of a computer system 200 usable in conjunction with an embodiment. Computer system 200 comprises a processor 202 (alternatively referred to as a processing device), an input/output (I/O) device 204, a memory 206, detection I/O device 208 communicatively coupled via a bus 210 or other interconnection communication mechanism. Additionally, computer system 200 comprises connections to antennas 110, 112 via detection I/O 208, i.e., circuitry output arranged to process and convert the analogue RF signals to digital detection signals), e.g. via bus 210.

Detection I/O device 208 comprises position determination unit (PDU) 124, main RF signal output 126, and position detection signal output 128.

In at least some embodiments, processor 202 may be a controller and/or and application-specific integrated circuit (ASIC) configured to execute a set of instructions such as those embodied by an embodiment.

Memory 206 (also referred to as a computer-readable medium) may comprise a random access memory (RAM) or other dynamic storage device, coupled to the bus 210 for storing data and/or instructions to be executed by processor 202, e.g., a position determination functionality 212. Memory 206 also may be used for storing temporary variables or other intermediate information during execution of instructions to be executed by processor 202. Memory 206 may also comprise a read only memory (ROM) or other static storage device coupled to the bus 210 for storing static information and instructions for the processor 202.

A storage device (optional dashed line box 212), such as a magnetic disk, optical disk, or electromagnetic disk, may also be provided and coupled to the bus 210 for storing data and/or instructions.

Position determination functionality 212 comprises a set of circuitry arranged to determine the position of RF tag 108 with respect to antennas 110, 112.

In at least some embodiments, position determination functionality 212 comprises a set of executable instructions which, when executed by processor 202, cause the processor to provide position determining functionality according to an embodiment.

I/O device 204 may comprise an input device, an output device and/or a combined input/output device for enabling user interaction. An input device may comprise, for example, a keyboard, keypad, mouse, trackball, trackpad, and/or cursor direction keys for communicating information and commands to processor 202. An output device may comprise, for example, a display, a printer, a voice synthesizer, etc. for communicating information to a user. In at least some embodiments, I/O device 204 may comprise a serial and/or parallel connection mechanism for enabling the transfer of one or more of files and/or commands, e.g., an Ethernet or other type network connection.

In at least one embodiment, the positioning system interfaces directly to an on-board control system, e.g., an on-board train control processor, through an Ethernet communication protocol or one of several serial interface protocols.

Figure 3:
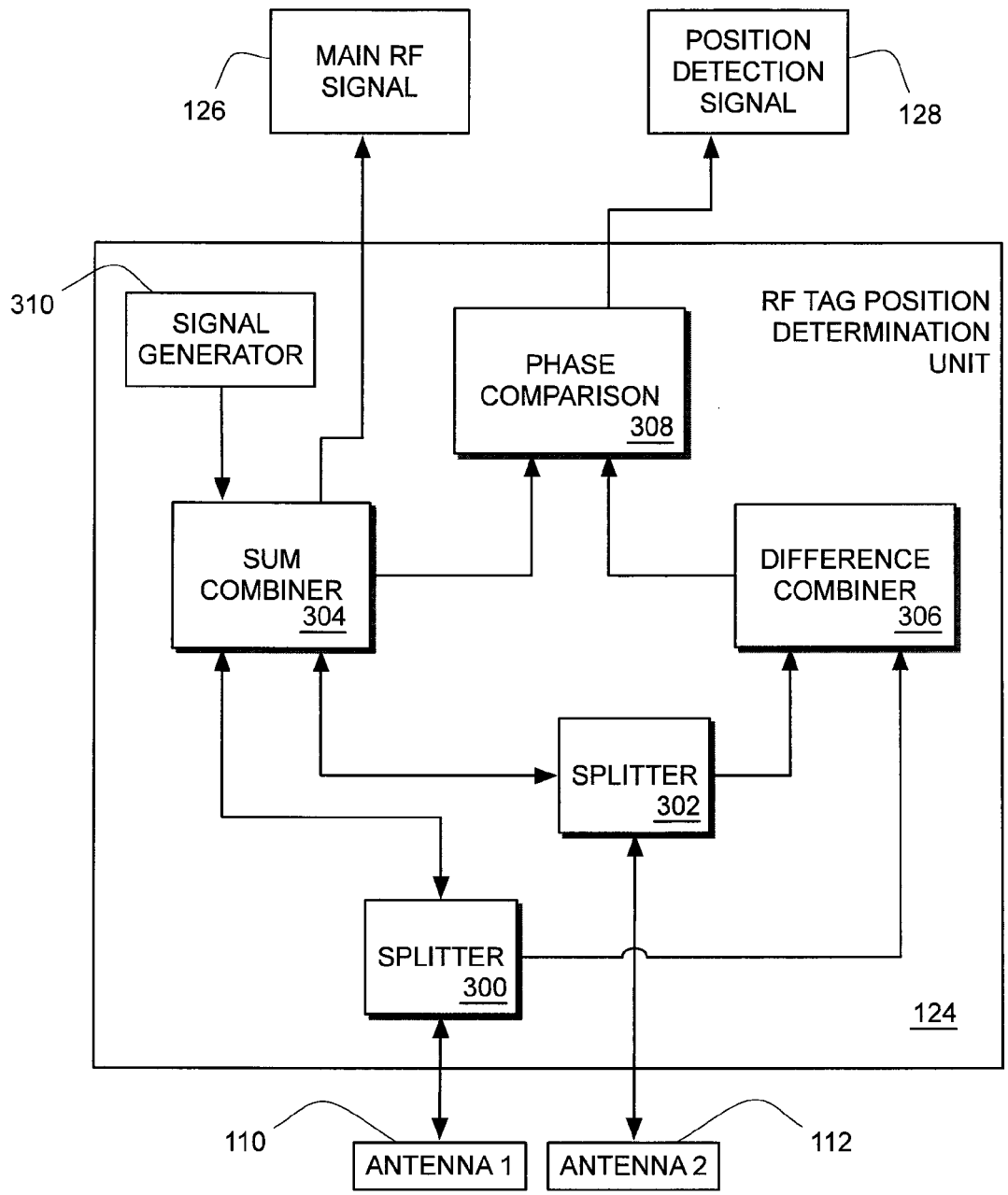
FIG. 3 is a high-level functional block diagram of a detail view of a position determination system according to another embodiment.

FIG. 3 depicts a high-level functional block diagram of a least a portion of position determination system 102. In particular, FIG. 3 depicts a detailed view of tag position determination unit 124 according to an embodiment. Position determination unit 124 comprises a first RF splitter component 300 and a second RF splitter component 302 each receiving a single input signal from antennas 110, 112, respectively. That is, splitter component 300 receives a signal input from antenna 110 and splitter component 302 receives a signal input from antenna 112. The signal input received by antennas 110, 112 is the response signal transmitted by RF tag 108 and received by antennas 110, 112.

In at least some embodiments, one or both of RF splitter components 300, 302 may comprise an integrated component of the antenna array, e.g., splitter 300 may comprise a portion of antenna 110.

Splitter component 300 transmits the received response signal from antenna 110 to a sum combiner component 304 and a difference combiner component 306. In at least some embodiments, splitter component 300 transmits the received response signal to sum combiner component 304 and difference combiner component 306 at the same time. similarly, splitter component 302 transmits the received response signal from antenna 112 to sum combiner component 304 and difference combiner component 306.

Sum combiner component 304 combines, in an phase coherent additive fashion, the received response signals from antenna 110 and antenna 112 and transmit the resulting signal to main RF signal output 126 and phase comparison component 308 (also referred to as a phase comparator). Difference combiner component 306 generates a phase coherent difference signal corresponding to the difference between the received response signal from antenna 110 and antenna 112 and transmits the resulting difference signal to phase comparison component 308.

In at least some embodiments, a single antenna device, e.g., antennas 110, 112 in a single combined unit, may comprise the functionality of splitter components 300, 302, sum combiner component 304, and difference combiner component 306.

Phase comparison component 308 compares the phase difference between the generated sum signal received from sum component 304 and the generated difference signal received from different component 306. Phase comparison component 308 transmits the resulting signal to position detection signal output 128. Position detection signal output 128 indicates that position determination system 102, specifically antennas 110, 112, are positioned over RF tag 108 at the time the generated resulting phase difference signal transitions from 0° (degrees) to 180° (degrees). That is, antennas 110, 112 are positioned on either side of RF tag 108 and/or RF tag 108 is positioned equally distant between antennas 110, 112. In at least some embodiments, the determination of a phase difference transition is performed based on a predetermined distance from 180 degrees phase difference.

In this manner, main RF signal output 126 is used for identification of RF tag 108 and position detection signal output 128 is used to identify passage of the center point between antennas 110, 112 over the RF tag.

FIG. 3 also depicts a signal generator 310 comprising a portion of position determination unit 124 and arranged to generate an interrogation signal for transmission to tag 108. The generated interrogation signal from signal generator 310 is provided to sum combiner component 304 which splits the received interrogation signal into two signals, one each sent to an antenna 110, 112. Antennas 110, 112 transmit the received detection signal as a phased signal toward tag 108.

In at least some embodiments, signal generator 310 may comprise a component separate from position determination unit 124. Further, in some embodiments, signal generator 310 may comprise more than one signal generator for generating the interrogation signal to be transmitted by antennas 110, 112.

Figure 4:
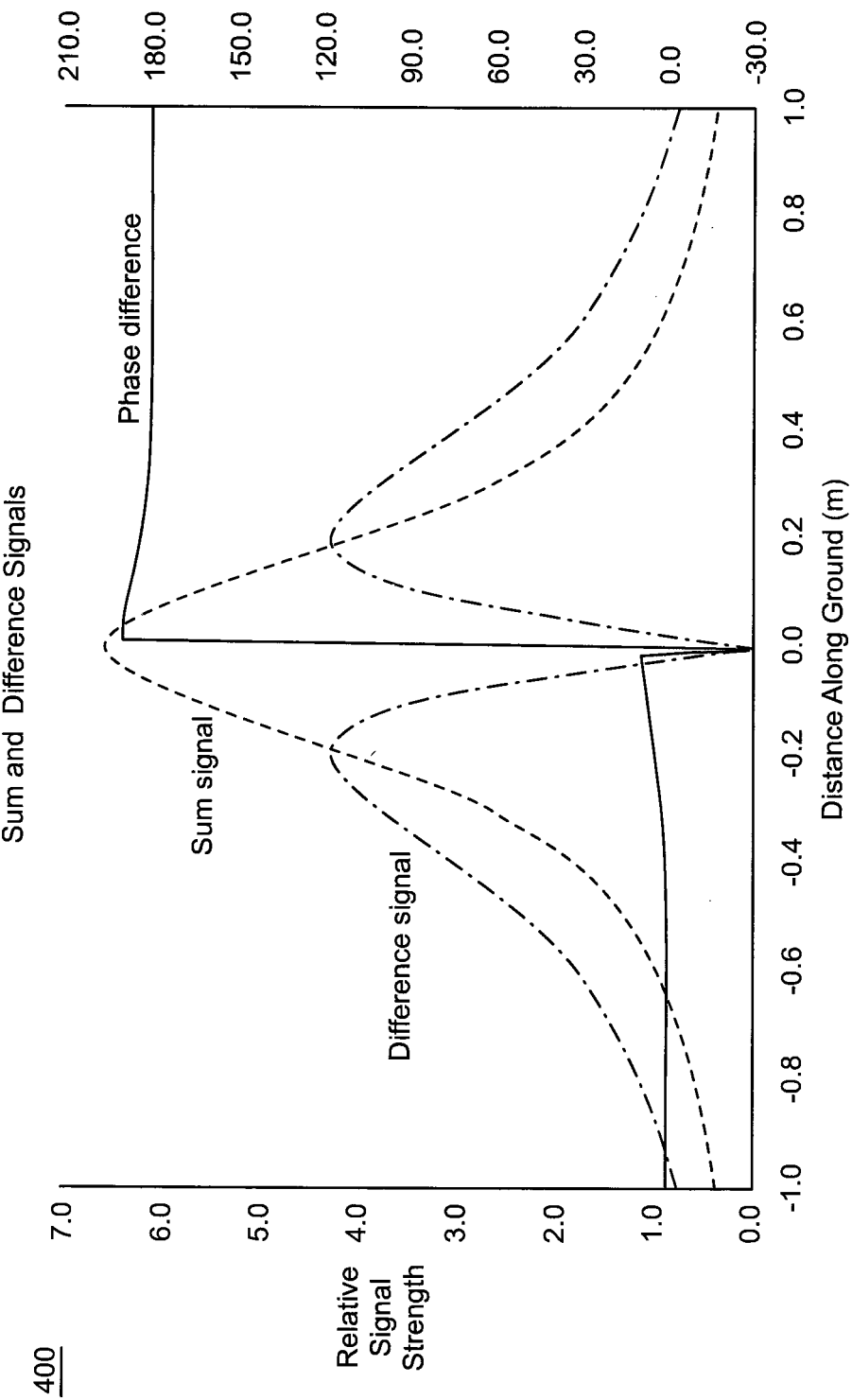
FIG. 4 is a graph of signal strength according to an embodiment.

FIG. 4 depicts a graph of signal strength of the generated sum signal and difference signal from sum component 304 and difference component 306, respectively. FIG. 4 depicts the signal received from a transponding or reflecting tag by two closely spaced antennas in sum and difference combinations as the antennas move linearly past the tag. Also, FIG. 4 depicts the determined phase difference between the sum signal and the difference signal. The vertical axis to the left of the graph of FIG. 4 indicates the relative signal strength of the sum signal and the difference signal. The vertical access to the right of the graph indicates the phase difference between the sum signal and the difference signal. The horizontal axis represents the distance with respect to the center point.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of determining an RF tag position, comprising:
   receiving a first response signal from a first antenna;
   receiving a second response signal from a second antenna;
   generating a sum signal based on the first and second response signals;
   generating a difference signal based on a difference between the first and second response signals; and
   generating a position detection signal responsive to a determination of a transition of a phase difference between the generated sum signal and the generated difference signal.

2. The method as claimed in claim 1, wherein the generating a position detection signal comprises generating a position detection signal responsive to a determination of a transition from within a predetermined distance from zero degrees phase difference to within a predetermined distance from 180 degrees phase difference.

3. A memory or a non-transitory computer-readable medium storing instructions which, when executed by a processor, cause the processor to perform the method of claim 1.

4. A position determination unit for determining position of a device based on received response signals from a phased combination of antennas, the unit comprising:
   a phase comparator arranged to generate a position detection signal based on a phase difference transition between a first sum component signal and a first difference component signal;
   a sum component coupled to the phase comparator and arranged to generate the first sum component signal responsive to receipt of a first response signal from a first antenna of the phased combination of antennas and a second response signal from a second antenna of the phased combination of antennas; and
   a different component coupled to the phase comparator and arranged to generate the first difference component signal responsive to receipt of a first response signal from the first antenna and a second response signal from the second antenna.

5. The position determination unit of claim 4, further comprising:
   at least one splitter component coupled between the sum component and at least one of the first antenna or the second antenna and coupled between the difference component and at least one of the first antenna or the second antenna.

6. The position determination unit of claim 4, further comprising:
   a signal generator coupled to the sum component and arranged to generate an interrogation signal for transmission to the phased combination of antennas.

* * * * *